United States Patent
Moyer et al.

(10) Patent No.: US 7,200,719 B2
(45) Date of Patent: Apr. 3, 2007

(54) PREFETCH CONTROL IN A DATA PROCESSING SYSTEM

(75) Inventors: William C. Moyer, Dripping Springs, TX (US); Lea Hwang Lee, Austin, TX (US); Afzal M. Malik, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 10/631,136

(22) Filed: Sep. 9, 2004

(65) Prior Publication Data

US 2006/0053256 A1  Mar. 9, 2006

(51) Int. Cl.
G06F 12/00 (2006.01)
G06F 9/34 (2006.01)

(52) U.S. Cl. ...................... 711/137; 711/213
(58) Field of Classification Search ................. 711/138
See application file for complete search history.

(56) References Cited

U.S. PATENT DOCUMENTS

| | | | |
|---|---|---|---|
| 5,146,578 A | 9/1992 | Zangenehpour | |
| 5,410,653 A * | 4/1995 | Macon et al. ................ | 711/137 |
| 5,619,663 A | 4/1997 | Mizrahi-Shalom et al. | |
| 6,085,291 A | 7/2000 | Hicks et al. | |
| 6,901,500 B1 * | 5/2005 | Hussain et al. ............. | 711/213 |
| 2003/0079089 A1 | 4/2003 | Barrick et al. | |
| 2004/0205299 A1 * | 10/2004 | Bearden ...................... | 711/137 |
| 2004/0221111 A1 * | 11/2004 | Phelps et al. ................ | 711/137 |

OTHER PUBLICATIONS

Karkhanis, T.; "Saving Energy with Just In Time Instruction Delivery"; ISLPED '02; Aug. 12-14, 2002; pp. 178-183; USA.

* cited by examiner

Primary Examiner—Gary Portka
Assistant Examiner—Duc T. Doan
(74) Attorney, Agent, or Firm—Joanna G. Chiu

(57) ABSTRACT

In one embodiment, a data processing system (10) includes a first master, storage circuitry (35) coupled to the first master (12) for use by the first master (12), a first control storage circuit (38) which stores a first prefetch limit (60), a prefetch buffer (42), and prefetch circuitry (40) coupled to the first control storage circuit, to the prefetch buffer, and to the storage circuitry. In one embodiment, the prefetch circuitry (40) selectively prefetches a predetermined number of lines from the storage circuitry into the prefetch buffer (42) based on whether or not a prefetch counter, initially set to a value indicated by the first prefetch limit, has expired. In one embodiment, the first prefetch limit may therefore be used to control how many prefetches occur between misses in the prefetch buffer.

23 Claims, 4 Drawing Sheets

| NAME | DESCRIPTION | SETTINGS |
|---|---|---|
| PREFETCH LIMIT FIELDS 60 AND 62 | THESE FIELDS CONTROL THE PREFETCH ALGORITHM USED BY THE PREFETCH CIRCUITRY. THESE FIELDS DEFINE A LIMIT ON THE MAXIMUM NUMBER OF SEQUENTIAL PREFETCHES WHICH WILL BE ATTEMPTED BETWEEN BUFFER MISSES FOR EACH CORRESPONDING MASTER | 000 - NO PREFETCHING IS PERFORMED<br><br>001 - A SINGLE ADDITIONAL LINE (NEXT SEQUENTIAL) IS PREFETCHED ON A BUFFER MISS<br><br>010 - UP TO TWO ADDITIONAL LINES MAY BE PREFETCHED FOLLOWING EACH BUFFER MISS BEFORE PREFETCHING IS HALTED. A SINGLE ADDITIONAL LINE (NEXT SEQUENTIAL) IS PREFETCHED ON A BUFFER MISS, AND THE NEXT SEQUENTIAL LINE IS PREFETCHED ON A BUFFER HIT (IF NOT ALREADY PRESENT)<br><br>011 - UP TO THREE ADDITIONAL LINES MAY BE PREFETCHED FOLLOWING EACH BUFFER MISS BEFORE PREFETCHING IS HALTED. ONLY A SINGLE ADDITIONAL PREFETCH IS INITIATED AFTER EACH BUFFER HIT OR MISS<br><br>100 - UP TO FOUR ADDITIONAL LINES MAY BE PREFETCHED FOLLOWING EACH BUFFER MISS BEFORE PREFETCHING IS HALTED. ONLY A SINGLE ADDITIONAL PREFETCH IS INITIATED AFTER EACH BUFFER HIT OR MISS<br><br>101 - UP TO FIVE ADDITIONAL LINES MAY BE PREFETCHED FOLLOWING EACH BUFFER MISS BEFORE PREFETCHING IS HALTED. ONLY A SINGLE ADDITIONAL PREFETCH IS INITIATED AFTER EACH BUFFER HIT OR MISS<br><br>110 - AN UNLIMITED NUMBER OF ADDITIONAL LINES MAY BE PREFETCHED FOLLOWING EACH BUFFER MISS. ONLY A SINGLE ADDITIONAL PREFETCH IS INITIATED AFTER EACH BUFFER HIT OR MISS<br><br>111 - RESERVED |

*FIG. 4*

PREFETCH CONTROL IN A DATA PROCESSING SYSTEM

FIELD OF THE INVENTION

The present invention relates to a data processing system, and more particularly, to prefetch control within a data processing system.

RELATED ART

Prefetching is commonly used to access information within a data processing system. By prefetching information in advance of a request for that information, the latency caused by accessing the information requested by the bus master may be reduced. However, in typical prefetching schemes a number of prefetches are wasted since the bus master may not request access to the prefetched information. Another disadvantage of general prefetching schemes is that the prefetch limit control provided by such systems is based on a fixed policy, allowing less flexibility and control. Therefore, a need exists for a method of prefetching that reduces the number of prefetches that are wasted, resulting in a reduced amount of power consumption and an optimization of data processor performance.

BRIEF DESCRIPTION OF THE DRAWINGS

The present invention is illustrated by way of example and not limited by the accompanying figures, in which like references indicate similar elements, and in which:

FIG. 4 illustrates, in table form, field descriptions of the control register of FIG. 2 in accordance with one embodiment of the present invention.

Figure 1:
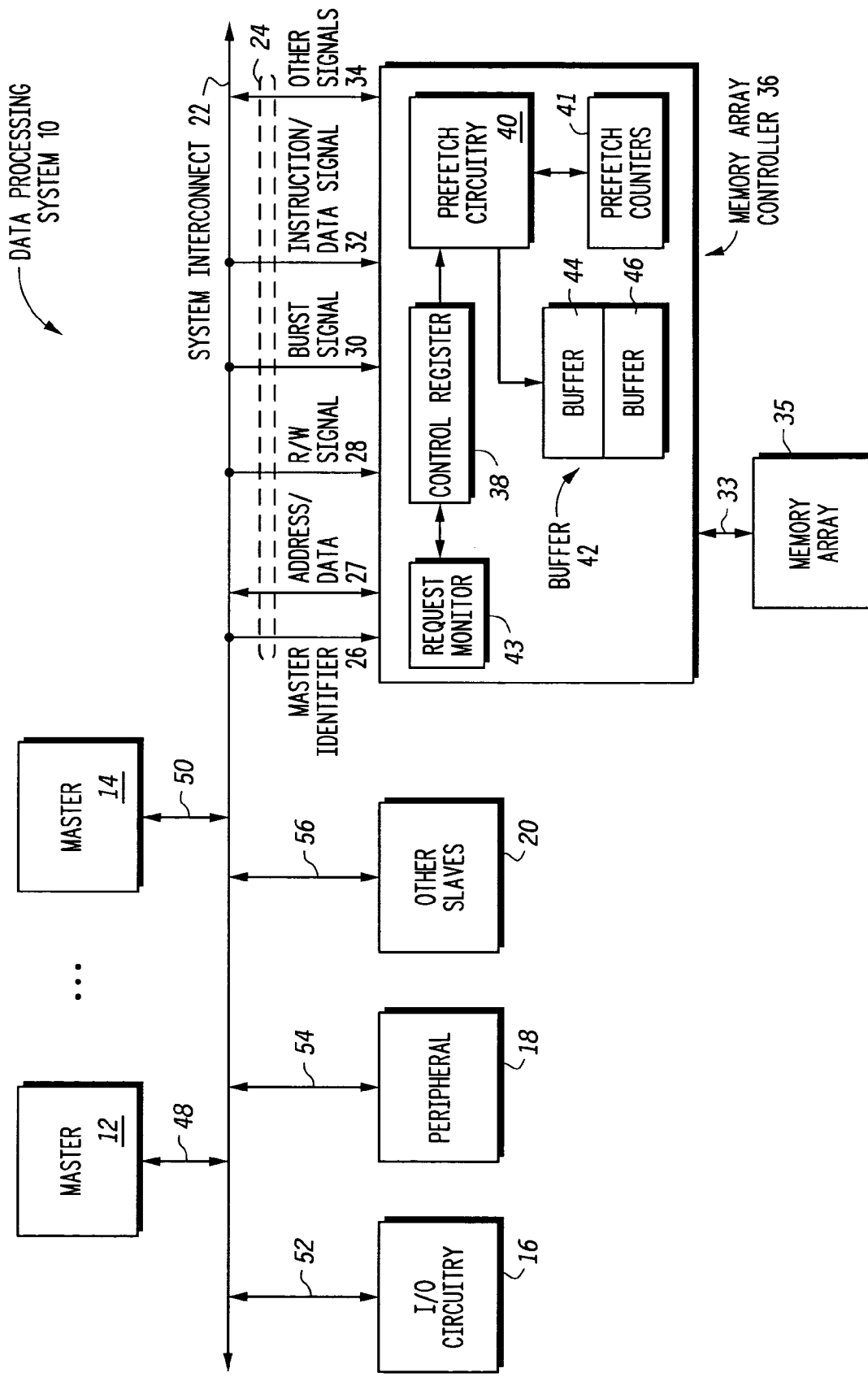
FIG. 1 illustrates, in block diagram form, a data processing system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

One embodiment of the present invention relates to dynamically controlling the number of sequential prefetch operations in order to prevent wasted prefetches. For example, by limiting the number of sequential prefetches performed after a buffer miss, the performance and power consumption of the memory control unit can be optimized. In one embodiment, limiting the number of sequential prefetches is accomplished by using a set of prefetch buffers, a control register, and prefetch counters, all of which will be further described below. In another embodiment, a software programmable control scheme is provided which allows for dynamic control of the number of sequential prefetch operations between buffer misses and may be preprogrammed by the user based upon the properties of the requesting master. For example, within a central processing unit (CPU) instructions are typically executed sequentially until a change of flow instruction or an exception is reached, which causes a discontinuity in sequential execution. The number of instructions executed sequentially is dependent upon the CPU and is a function of the type of application program being executed. Some applications show extended sequential execution, while others behave more erratically, with frequent change of flow events. Therefore, depending on the application, the desired number of prefetches may differ. In another embodiment, a DMA master is provided in which transfers occur sequentially until an end-of-transfer or a channel switch occurs. For this example, long sequences are expected and the prefetch limit corresponding to the DMA master can be adjusted accordingly. By selectively controlling the number of prefetches within a data processing system, wasted prefetches, which consume excess power and result in lower performance, can be prevented.

One embodiment of the present invention relates to a data processing system including a master, storage circuitry coupled to the master, a control storage circuit which stores a prefetch limit, a prefetch buffer, and prefetch circuitry coupled to the control storage circuit, prefetch buffer, and storage circuitry. In one embodiment, the prefetch circuitry selectively prefetches a predetermined number of lines from the storage circuitry into the prefetch buffer, wherein the prefetch limit controls the number of prefetches that occur between misses in the prefetch buffer.

Another embodiment of the present invention relates to a method for performing prefetch in a data processing system. A plurality of access requests from a master to access storage circuitry is received and a prefetch limit is used to limit a number of prefetches performed between misses in a prefetch buffer resulting from at least a portion of the plurality of access requests. In one embodiment of the present invention a prefetch control circuit is provided to store the prefetch limit.

Yet another embodiment of the present invention relates to a method for performing a prefetch in a data processing system in which a read request from a master to access storage circuitry is received and it is determined whether the read request results in a hit or a miss in a prefetch buffer. In one embodiment, if the read request results in a hit, a prefetch is selectively performed of a predetermined number of lines from the storage circuitry into the prefetch buffer based at least in part on a prefetch counter reaching a first value. In one embodiment, if the read request results in a miss, a demand fetch is performed in response to the read request and the prefetch counter is set to a second value.

FIG. 1 illustrates one embodiment of data processing system 10. Data processing system 10 includes a master 12 (also referred to as an interconnect master 12), a master 14 (also referred to as an interconnect master 14), a memory array controller 36, a system interconnect 22, I/O circuitry 16, a peripheral 18, other slaves 20, and a memory array 35. Master 12 is bidirectionally coupled to system interconnect 22 via conductors 48, master 14 is bidirectionally coupled to system interconnect 22 via conductors 50, I/O circuitry is bidirectionally coupled to system interconnect 22 via conductors 52, peripheral 18 is bidirectionally coupled to system interconnect 22 via conductors 54, other slaves 20 is bidirectionally coupled to system interconnect 22 via conductors 56, and memory array controller 36 is bidirectionally coupled to system interconnect 22 via conductors 24. Conductors 24 include conductors for communicating a master identifier 26, address/data 27, a R/W signal 28, a burst signal 30, an instruction/data signal 32, and other signals 34. Memory array controller 36 includes a control register 38, request monitor 43, prefetch circuitry 40, prefetch counters 41, and buffer 42 (also referred to as prefetch buffers), and is bidirectionally coupled to memory array 35 via conductors 33. Control register 38 is coupled to request monitor 43 and prefetch circuitry 40, which is coupled to buffer 42 and prefetch counters 41. Buffer 42 includes a buffer 44 and a buffer 46.

Although only one peripheral 18 is illustrated in FIG. 1, data processing system 10 may include any number of peripherals coupled to system interconnect 22. Likewise, any number of masters and slaves may be coupled to system interconnect 22 and are not limited to those shown in FIG. 1. Note also that in one embodiment, all of data processing system 10 may be located on a single integrated circuit or within a same device. Alternatively, data processing system 10 may include any number of separate integrated circuits or separate devices interconnected with each other. For example, in one embodiment, the memory and memory controller (such as, for example, memory array 35 and memory array controller 36) may be located on one or more integrated circuits, separate from the rest of data processing system 10.

In one embodiment, bus master 12 and bus master 14 may be processors capable of executing instructions, such as microprocessors, digital signal processors, etc., or may be any other type of interconnect master, such as direct memory access (DMA) circuitry or debug circuitry. Peripheral 18 may be any type of peripheral, such as a universal asynchronous receiver transmitter (UART), a real time clock (RTC), a keyboard controller, etc. Note that other slaves 20 may include any type of interconnect slaves, such as, for example, a memory accessible by masters 12 and 14, as well as any type of peripheral which resides on the system bus, including the same types of peripherals as peripheral 18. I/O circuitry 16 may include any type of I/O circuitry which receives or provides information external to data processing system 10.

In the illustrated embodiment, memory array controller 36 and memory array 35 correspond to another slave coupled to system interconnect 22. Note that in alternate embodiments, memory array 35 can include any number of arrays. Note also, in alternate embodiments, memory array 35 may be referred to as storage circuitry 35. Memory array 35 may be located on a same integrated circuit as masters 12 and 14 or on a separate integrated circuit. Furthermore, memory array 35 may be any type of memory, such as, for example, a read only memory (ROM), a random access memory (RAM), non-volatile memory (e.g. Flash), etc. Also, memory array 35 may be a memory or other storage located within another peripheral or slave.

System interconnect 22 interconnects master 12, master 14, I/O circuitry 16, peripheral 18, other slaves 20, and memory array controller 36. In one embodiment, as illustrated in FIG. 1, system interconnect 22 is implemented as a system bus operating according to a system bus protocol. Alternatively, system interconnect 22 can be implemented using interconnect circuitry, such as, for example, switching circuitry, which routes information between the various devices.

In operation, masters 12 and 14 request access of system interconnect 22 to request access to other slaves 20, to peripherals 18, or to memory array 35 via memory array controller 36. A requesting master can provide an access request, via system interconnect 22, to memory array controller 36. The access request can be, for example, a read request or a write request for either data or instructions. Memory array controller 36, in response to a read access request, provides the requested information (data or instructions) back to the requesting master via system interconnect 22. Note that the read access request from a requesting master may also be referred to as a demand fetch.

In one embodiment, for an access request, a master identifier 26 is provided to memory array controller 36 which identifies which master is requesting the current access. R/W signal 28 is also provided to memory array controller 36 to indicate whether the current access request is for a read or a write type of access. Burst signal 30 is provided to memory array controller 36 to indicate whether the current access request is a burst or a non-burst type of access. Instruction/data signal 32 is provided to memory array controller 36 to indicate whether the current access request is for an instruction or data. Memory array controller 36 also receives address information corresponding to the current access request and provides the requested information via address/data 27. Any other signals needed to communicate to and from memory array controller 36 may be provided within other signals 34. In other embodiments, some or all of master identifier 26, R/W signal 28, burst signal 30, instruction/data signal 32, and other signals 34 may not be present.

In one embodiment, prefetch circuitry 40 may prefetch information from memory array 35 into buffer 42, such as buffer 44 and buffer 46. Therefore, in response to a read access request from a requesting master, memory array controller 36 may be able to provide the requested information from buffer 42 (if the information was already prefetched) rather than having to fetch the information from memory array 35, which generally has a longer access time as compared to buffer 42. In one embodiment, prefetch circuitry includes tag portions (not shown) corresponding to each of buffers 44 and 46, and comparison circuitry (not shown) in order to determine whether the information being requested in a current access request is already located in one of buffers 44 and 46. For example, prefetch circuitry can compare the incoming address corresponding to the current access request via address/data 27 with the tag portions to determine whether or not the information has already been prefetched. If the information has not been prefetched, memory array controller 36 can provide the requested information from memory array 35.

In the illustrated embodiment, two buffers are illustrated (buffer 44 and buffer 46). However, in alternate embodiments, buffer 42 may include any number (one or more) of buffers. In one embodiment, prefetch circuitry may prefetch information from memory array 35 into one of buffers 44 and 46 while providing information to a requesting master from another one of buffers 44 and 46. That is, the use of more than one buffer allows for a prefetch to memory array 35 to occur at least partially simultaneously with servicing an access request from a requesting master.

Since providing information from buffer 42 has a reduced access time as compared to accessing memory array 35 for responding to an access request from a requesting master, it is desirable to prefetch information from memory array 35 into buffer 42 that will subsequently be requested. However, note that prefetching is speculative in that it is uncertain whether the prefetched information will actually be requested by a master. For example, if the prefetched information is not subsequently requested, then the prefetch becomes a wasted prefetch which consumes excess power and lowers performance. Therefore, one embodiment of the present invention controls prefetching of speculative data into buffer 42 utilizing prefetch counters 41 and control register 38 by limiting the number of prefetches between misses in buffer 42 for each master (such as masters 12 and 14). For example, one embodiment uses a control register to store a prefetch limit for each master such that the number of prefetches for each master is based on properties of the requesting master. In another embodiment, the control register may also be used to determine how many lines are prefetched during each prefetch, as will be discussed in more detail below.

Figure 2:
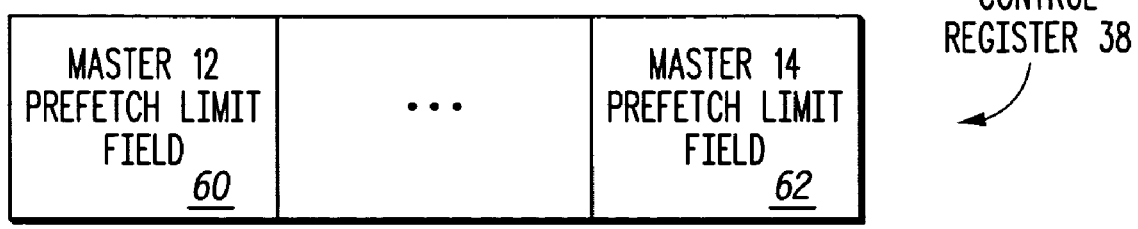
FIG. 2 illustrates, in block diagram form, a control register of the data processing system of FIG. 1, in accordance with one embodiment of the present invention.

FIG. 2 illustrates one embodiment of control register 38, which includes a prefetch limit field for each master. For example, as illustrated in FIG. 2, control register 38 includes master 12 prefetch limit field 60 and master 14 prefetch limit field 62. In alternate embodiments, control register 38 may include more or less fields, as needed, to store the desired prefetch limits. Also note that control register 38 may be programmed via instructions from a master such as master 12 or master 14 which are coupled to system interconnect 22. The prefetch limit field values may be provided, for example, by a user or may be programmed at design time.

In one embodiment, prefetch circuitry 40 is bidirectionally coupled to request monitor 43, which profiles access requests from one or more masters, such as master 12 or master 14, whose profiles may be used to dynamically update the prefetch limit. For example, request monitor 43 may monitor the number of accesses made to buffer 42 between successive buffer misses and update or set the limits accordingly. In alternate embodiments, request monitor 43 can be excluded from the data processing system 10 and the prefetch limit can be, for example, user programmable, or hardwired.

Figure 3:
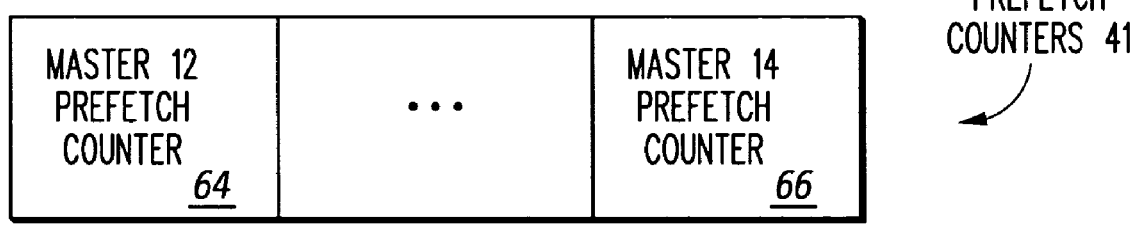
FIG. 3 illustrates, in block diagram form, prefetch counters of the data processing system of FIG. 1, in accordance with one embodiment of the present invention.

FIG. 3 illustrates one embodiment of prefetch counters 41, which includes a prefetch counter corresponding to each master. For example, in one embodiment, prefetch counters 41 include a prefetch counter 64 corresponding to master 12, and a prefetch counter 66 corresponding to master 14. In an alternate embodiment, data processing system 10 may include a single prefetch counter per memory array controller (such as memory array controller 36) that is shared by one or more masters, such as master 12 or master 14. Prefetch counters 41 can alternatively be referred to as a counter, counters, or any other device (software or hardware) that operates similar to a counter.

FIG. 4 illustrates one embodiment of the field definitions of control register 38 of FIG. 2. For example, in one embodiment, each of fields 60 and 62 are three-bit fields, where each field is capable of having 8 values (000, 001, 010, 011, 100, 101, 110, and 111). In one embodiment of the field descriptions as described in FIG. 4, prefetch limit fields 60 and 62 are used to control the prefetch algorithm used by the prefetch circuitry. For example, prefetch limit fields 60 and 62 define a limit on the maximum number of sequential prefetches which will be attempted between buffer misses for each corresponding master. Prefetch limit fields 60 and 62 may also be used to define how many lines are prefetched each time.

For example, in the illustrated embodiment, a value of 000 indicates that no prefetching is performed between access requests from a corresponding master that result in misses in buffer 42. That is, if master 12 prefetch limit field 60 is set to 000, then no prefetching occurs between misses in buffer 42 caused by access requests from master 12. Similarly, if master 14 prefetch limit field 62 is set to 000, then no prefetching occurs between misses in buffer 42 caused by access requests from master 14. A value of 001 for prefetch limit fields 60 and 62 indicates that a single additional line (next sequential line in memory array 35) is prefetched on a buffer miss. A value of 010 for prefetch limit fields 60 and 62 indicates that up to two additional lines may be prefetched following each buffer miss before prefetching is halted, where a single additional line (next sequential line in memory array 35) is prefetched on a buffer miss, and the next additional sequential line is prefetched on a buffer hit (if not already present).

Still referring to the embodiment of FIG. 4, a value of 011 for prefetch limit fields 60 and 62 indicates that up to three additional lines may be prefetched following each buffer miss before prefetching is halted. That is, for example, a single prefetch may be initiated after the initial miss, and a single additional prefetch may be initiated after each subsequent buffer hit (up to a total of three single prefetches). A value of 100 for prefetch limit fields 60 and 62 indicates up to four additional lines may be prefetched following each buffer miss before prefetching is halted. That is, for example, a single prefetch may be initiated after the initial miss, and a single additional prefetch may be initiated after each subsequent buffer hit (up to a total of four single prefetches). A value of 101 for prefetch limit fields 60 and 62 indicates up to five additional lines may be prefetched following each buffer miss before prefetching is halted. That is, for example, a single prefetch may be initiated after the initial miss, and a single additional prefetch may be initiated after each subsequent buffer hit (up to a total of five single prefetches).

Still referring to the embodiment of FIG. 4, a value of 110 for prefetch limit fields 60 and 62 indicates an unlimited number of additional lines may be prefetched following each buffer miss. That is, for example, a single additional prefetch is initiated after each buffer hit or miss. (Note that in this embodiment, the value of 111 is reserved and is not being used to set a prefetch operation). In alternate embodiments, note that control register 38 may include more or less fields for each master utilizing more or less bits as needed. Also, alternate definitions of prefetch limit fields 60 and 62 may be applied as necessary to control prefetch circuitry 40. The use and definition of prefetch limit fields will be further described in reference to FIG. 5.

Figure 5:
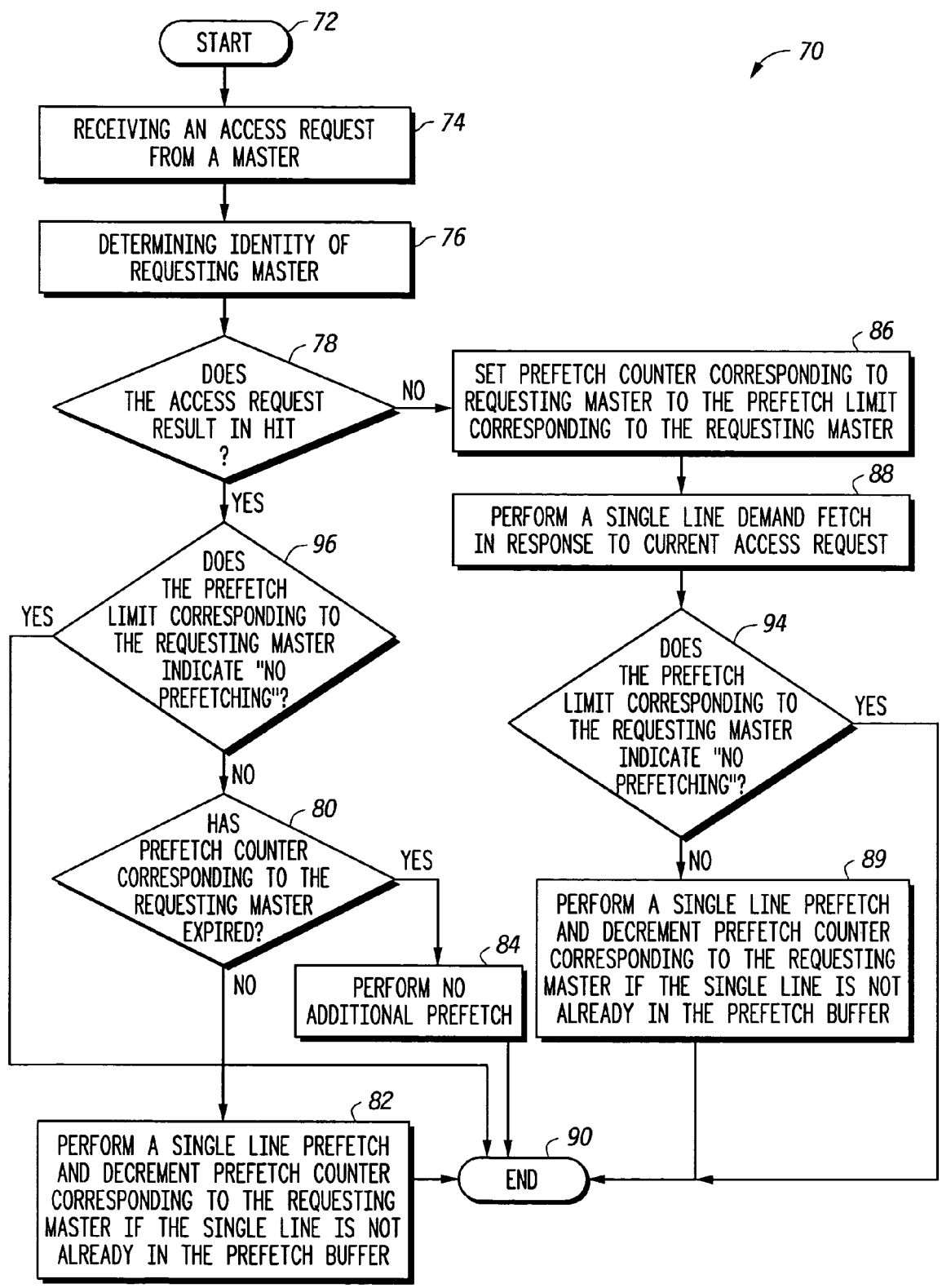
FIG. 5 illustrates, in flow diagram form, operation of the data processing system of FIG. 1 in accordance with one embodiment of the present invention.

FIG. 5 illustrates, in flow diagram form, operation of data processing system 10 in accordance with one embodiment of the present invention. Flow 70 begins with start 72 and proceeds to block 74 where an access request from a master, such as master 12 or master 14, is received. This access request can be many different types of access requests, such as a read request, a write request, a burst request, a non-burst request, a request for data, a request for instructions, etc.

However, for ease of explanation herein, it will be assumed that the access request is a read request.

Flow then proceeds to block 76 where the identity of the requesting master is determined using, for example, a master identifier as provided by master identifier 26 of FIG. 1. Accordingly, different masters may have different master identifiers, for example, master 12 may have an identifier of 0 and master 14 may have an identifier of 1. Therefore, each master can be assigned a unique identifier. In an alternate embodiment, some masters may share a same identifier. Also, note that in alternate embodiments, which master is requesting the access may be determined in different ways rather than by providing a signal such as master identifier 26. In one embodiment, the correct prefetch counter and corresponding prefetch limit can be selected from a plurality of prefetch counters and limits based upon the identity of the master identifier.

Referring back to FIG. 5, flow then proceeds to decision diamond 78, where it is determined whether the access request results in a hit or miss. If the access request results in a miss, flow then proceeds to block 86, where the prefetch counter (one of the counters in prefetch counters 41) corresponding to the requesting master is set to the prefetch limit (e.g., indicated by one of the prefetch limit fields in control register 38) corresponding to the requesting master. This prefetch limit is used to control the number of prefetches between buffer misses of the requesting master. Flow then proceeds to block 88, where a single line demand fetch is performed in response to the current access request. Note that in alternate embodiments additional lines may be fetched during the demand fetch.

Flow then proceeds to decision diamond 94 where it is determined whether the prefetch limit corresponding to the requesting master indicates "No Prefetching". (For example, in the embodiment of FIG. 4, no prefetching is indicated by a value of 000 for the corresponding prefetch limit field in control register 38.) If no prefetching is indicated, flow proceeds to ending oval 90. However, if no prefetching is not indicated, flow then proceeds to block 89, where a single line prefetch is performed and the prefetch counter corresponding to the requesting master is decremented if the single line is not already in the prefetch buffer. Note that in alternate embodiments block 89 may not be present, i.e., a prefetch may not occur in response to a miss and hence the corresponding prefetch counter may not be updated.

If the result at decision diamond 78 is a hit, flow then proceeds to decision diamond 96 where it is determined whether the prefetch limit corresponding to the requesting master indicates "No Prefetching". If no prefetching is indicated, flow proceeds to ending oval 90. Otherwise, if no prefetching is not indicated, flow then proceeds to decision diamond 80, where it is determined whether the prefetch counter corresponding to the requesting master has expired. If the prefetch counter has not expired, flow then proceeds to block 82. In block 82, a single line prefetch is performed and the prefetch counter corresponding to the requesting master is decremented if the single line is not already in the prefetch buffer, thus keeping track of the number of prefetches that have occurred since the last miss. Flow then proceeds to ending oval 90.

Referring back to decision block 80, if the prefetch counter has expired, flow then proceeds to block 84, where no additional prefetching is performed. Therefore, even though another hit has occurred, no more prefetching occurs until the corresponding prefetch counter is again set to a prefetch limit in response to a miss in block 86. Thus, in this manner, the prefetch limit may be used to limit the number of prefetches between buffer misses for a corresponding requesting master. Flow then proceeds to ending oval 90.

In the embodiment of FIG. 5, the prefetch counter is decremented by a fixed value, for example, 1, to indicate a prefetch was performed (e.g., in blocks 82 and 89 of FIG. 5). The prefetch counter is considered expired when the value of the prefetch counter reaches its lower limit, in this case 0. In an alternate embodiment, the initial value of the prefetch counter may be set to 0 (such as in block 86 of FIG. 5), and the prefetch counter may therefore be incremented by a fixed value, for example, 1, to indicate a prefetch was performed (such as in blocks 82 and 89 of FIG. 5). In this alternate embodiment, the prefetch counter is considered expired when the value of the counter reaches the corresponding prefetch limit.

Note also that in the embodiment of FIG. 5, only a single additional line is fetched during each prefetch (such as in blocks 82 and 89) as defined by the fields of FIG. 4. However, note that in an alternate embodiment, a predetermined number of lines (one or more) may be fetched during each prefetch (such as in blocks 82 and 89 of FIG. 5). That is, a predetermined number of lines may be prefetched in response to a hit, a miss, or both, if the lines are not already present in the prefetch buffer. Also, the corresponding prefetch counter may be decremented (or incremented) accordingly so as to keep track of the number of prefetches. Therefore, note that the prefetch limit fields such as prefetch limit fields 60 and 62 in control register 38 may be used to define a prefetch of any predetermined number of lines after each miss or hit or both (until the corresponding counter expires) rather that just a single additional line.

As has been described above, a prefetch counter may be used for each master, however, in an alternate embodiment, a single counter may be shared by multiple masters. In this embodiment, a priority scheme may be used where, for example, the priority scheme may be programmed by the user as to which master takes control of the single counter. For example, master 14 may require use of the counter that is currently being used by master 12 and if master 14 has priority over master 12, then master 12 can relinquish control of the counter to master 14. In this manner, multiple masters may share a single counter. Alternatively, the counter may be shared such that a prefetch limit may limit the number of prefetches between successive misses, regardless of the identity of the requesting master, rather than on a per master basis. In this alternate embodiment, the shared counter would be set (such as in block 86 of FIG. 5) each time a miss occurs, regardless of the identity of the requesting master. Similarly, decision diamond 80 and blocks 82 and 89 of FIG. 5 would operate on this shared counter, regardless of the identity of the requesting master. Also note in yet another embodiment, multiple masters may share a prefetch limit in control register 38.

When dealing with different types of masters in a data processing system it may be necessary to optimize performance of the memory control unit. Different types of masters execute and transfer instructions and data in various ways, therefore one can appreciate a prefetching limitation scheme that takes into account different access characteristics of the masters and limits the number of prefetches between misses, allowing for dynamic control of the sequential prefetches. For example, instructions in a CPU are typically performed sequentially until a change of flow has been reached, whereas, with a DMA, most transfers occur sequentially until an end-of-transfer or a channel switch occurs. Therefore the prefetch limit fields of the CPU and DMA may be set differently such that, for example, the DMA allows for a greater number of prefetches between misses as compared to the CPU. Thus, the prefetch limit fields can be programmed to take into account various differences between masters and to control the number of prefetches that occur between successive misses, as was described above. That is, after the prefetch limit is reached, no further prefetching occurs until the next buffer miss, since the likelihood that a sequential prefetch will be used decreases as the number of sequential prefetches increases. Also, it can be appreciated how the prefetch limit fields may be used to control the number of lines prefetch in response to each hit or miss or both (prior to the prefetch limit being reached) in order to further reduce wasted prefetches.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The terms a or an, as used herein, are defined as one or more than one. The terms including and/or having, as used herein, are defined as comprising (i.e., open language). As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A data processing system, comprising:
   a first master;
   storage circuitry, coupled to the first master, for use by the first master;
   a first control storage circuit which stores a first prefetch limit;
   a prefetch buffer; and
   prefetch circuitry, coupled to the first control storage circuit, to the prefetch buffer, and to the storage circuitry, said prefetch circuitry selectively prefetches a predetermined number of lines from the storage circuitry into the prefetch buffer, wherein the first prefetch limit controls how many prefetches occur between misses in the prefetch buffer, wherein when a hit occurs in the prefetch buffer and a total number of prefetches that have occurred since a previous miss in the prefetch buffer has reached the first prefetch limit, a prefetch does not occur in response to the hit.

2. The data processing system of claim 1, further comprising:
   a first prefetch counter, wherein the prefetch circuitry selectively prefetches the predetermined number of lines from the storage circuitry into the prefetch buffer based on the first prefetch counter.

3. The data processing system of claim 1, further comprising:
   a second master, wherein the storage circuitry is coupled to the second master; and is for use by the second master; and
   a second control storage circuit which corresponds to the second master and stores a second prefetch limit.

4. The data processing system of claim 3, wherein the first prefetch limit controls how many prefetches for the first master occur between misses in the prefetch buffer on read requests from the first master, and wherein the second prefetch limit controls how many prefetches for the second master occur between misses in the prefetch buffer on read requests from the second master.

5. The data processing system of claim 3, further comprising:
   a first prefetch counter, wherein the prefetch circuitry selectively prefetches the predetermined number of lines for the first master from the storage circuitry into the prefetch buffer based on the first prefetch counter; and
   a second prefetch counter, wherein the prefetch circuitry selectively prefetches a predetermined number of lines for the second master from the storage circuitry into the prefetch buffer based on the second prefetch counter.

6. The data processing system of claim 3, wherein the prefetch circuitry:
   selectively prefetches the predetermined number of lines for the first master based on the first prefetch counter in response to at least one of a hit or a miss in the prefetch buffer corresponding to an access request from the first master; and
   selectively prefetches the predetermined number of lines for the second master based on the second prefetch counter in response to at least one of a hit or a miss in the prefetch buffer corresponding to an access request from the second master.

7. The data processing system of claim 1, wherein the prefetch circuitry selectively prefetches the predetermined number of lines in response to at least one of a hit or a miss in the prefetch buffer.

8. The data processing system of claim 1, wherein the first control storage circuit is programmable.

9. The data processing system of claim 1, further comprising a request monitor coupled to the first control storage circuitry, wherein the request monitor selectively updates the prefetch limit based on a number of buffer hits in the prefetch buffer accessed between two misses in the prefetch buffer.

10. A method for performing prefetch in a data processing system, comprising:
    receiving a plurality of access requests from a master to access storage circuitry; and
    using a prefetch limit to limit a number of prefetches performed between misses in a prefetch buffer resulting from at least a portion of the plurality of access requests, wherein when a hit occurs in the prefetch buffer and a total number of prefetches that have occurred since a previous miss in the prefetch buffer has reached the first prefetch limit, a prefetch does not occur in response to the hit.

11. The method of claim 10, further comprising providing a prefetch control circuit to store the prefetch limit.

12. The method of claim 10, wherein using the prefetch limit to limit the number of prefetches comprises:
    counting prefetches after a miss in the prefetch buffer to determine when the prefetch limit is reached.

13. The method of claim 12, wherein each prefetch prefetches a single line from the storage circuitry.

14. The method of claim 13, wherein each single line prefetch is performed in response to at least one of a hit or a miss in the prefetch buffer.

15. A method for performing prefetch in a data processing system, comprising:

receiving a read request from a master to access storage circuitry;

determining whether the read request results in a hit or a miss in a prefetch buffer;

if the read request results in a hit, selectively performing a prefetch of a predetermined number of lines from the storage circuitry into the prefetch buffer based at least in part on a prefetch counter reaching a first value; and if the read request results in a miss, performing a demand fetch in response to the read request and setting the prefetch counter to a second value.

16. The method of claim 15, wherein selectively performing the prefetch of the predetermined number of lines is further based on whether or not the predetermined number of lines is already present in the prefetch buffer.

17. The method of claim 16, further comprising:

prefetching the predetermined number of lines from the storage circuitry and updating the prefetch counter when the read request results in a hit, the prefetch counter has not reached the first value, and the predetermined number of lines is not already present in the prefetch buffer.

18. The method of claim 17, wherein the second value corresponds to a prefetch limit and wherein updating the counter comprises decrementing the prefetch counter.

19. The method of claim 17, wherein the first value corresponds to a prefetch limit and wherein updating the counter comprises incrementing the prefetch counter.

20. The method of claim 16, further comprising:

not prefetching from the storage circuitry when the read request results in a hit and the prefetch counter has reached the first value.

21. The method of claim 15, further comprising prefetching a predetermined number of lines from the storage circuitry when the read request results in a miss.

22. The method of claim 15, wherein selectively performing a prefetch of a predetermined number of lines from the storage circuitry into the prefetch buffer based at least in part on a prefetch counter reaching a first value is performed such that the predetermined number of lines comprises only a single line.

23. The method of claim 15, further comprising:

receiving a master identifier corresponding to the master; and selecting the prefetch counter from a plurality of prefetch counters based on the master identifier.

* * * * *

UNITED STATES PATENT AND TRADEMARK OFFICE
CERTIFICATE OF CORRECTION

PATENT NO. : 7,200,719 B2
APPLICATION NO. : 10/631136
DATED : April 3, 2007
INVENTOR(S) : William C. Moyer et al.

Page 1 of 1

It is certified that error appears in the above-identified patent and that said Letters Patent is hereby corrected as shown below:

On Title Page, Item 22:

Change "Sep. 9, 2004" to --July 31, 2003--

Signed and Sealed this

Twenty-sixth Day of June, 2007

JON W. DUDAS
*Director of the United States Patent and Trademark Office*